United States Patent [19]
Fox et al.

[11] Patent Number: 6,029,429
[45] Date of Patent: Feb. 29, 2000

[54] HEADER FOR A CROP HARVESTING MACHINE WITH ADJUSTMENT OF A LONGITUDINAL SHAPE OF THE CUTTER BAR

[75] Inventors: Thomas R. Fox; Francois Talbot, both of Winnipeg, Canada

[73] Assignee: MacDon Industries Ltd., Winnipeg, Canada

[21] Appl. No.: 08/810,987

[22] Filed: Feb. 27, 1997

[51] Int. Cl.⁷ .................................................. A01D 75/28
[52] U.S. Cl. .......................... 56/10.2 E; 56/14.9; 56/364
[58] Field of Search .............................. 56/14.9, 10.2 E, 56/15.5, 249, 249.5, 250, 294, 364

[56] References Cited

U.S. PATENT DOCUMENTS

| | | | |
|---|---|---|---|
| 4,211,057 | 7/1980 | Dougherty et al. | 56/10.2 E |
| 4,517,792 | 5/1985 | Denning et al. | 56/10.2 E |
| 5,115,628 | 5/1992 | Garter et al. | 56/10.2 E |
| 5,473,872 | 12/1995 | Fox et al. | 56/14.9 |
| 5,535,578 | 7/1996 | Honey | 56/14.9 |

OTHER PUBLICATIONS

Brochure of Case IH—"Soybean Header" (2 pages) undated.
Brochure of John Deere—"Dial–a–matic Header Height Control" (1 page) undated.

*Primary Examiner*—Heather Shackelford
*Attorney, Agent, or Firm*—Adrian D. Battison; Murray E. Thrift

[57] ABSTRACT

A header includes a substantially rigid header frame having a main longitudinal rear tube and a plurality of beams extending downwardly and forwardly from the main tube to a cutter bar which is maintained substantially straight and parallel to the main tube. Adjustment of the longitudinal shape of the cutter bar is effected after the header is assembled by operating screwjacks on two inner beams which cause plastic bending of the beams to raise or lower a center portion of the cutter bar so that when assembled the cutter bar is longitudinally straight or slightly upwardly concave. This adjustment after the assembly is complete allows the cutter bar to be adjusted to the required longitudinal shape for optimum cooperation with the reel.

14 Claims, 4 Drawing Sheets

HEADER FOR A CROP HARVESTING MACHINE WITH ADJUSTMENT OF A LONGITUDINAL SHAPE OF THE CUTTER BAR

This invention relates to a header for a crop harvesting machine of a type including a cutter bar arranged across a front edge of the header for cutting a standing crop in which a longitudinal shape of the cutter bar can be adjusted.

BACKGROUND OF THE INVENTION

A header for a crop harvesting machine generally comprises a main longitudinal support member in the form of an elongate tube which extends across substantially the full width of the header frame and defines a main structural member for the header frame. The tube carries a plurality of forwardly and downwardly extending support beams which include a first portion extending downwardly and a second portion attached to a lower end of the first portion and extending forwardly therefrom toward a forward end of the support beams. The cuter bar is attached to the forward end of the support beams and is thus held thereby in a position generally parallel to the main support tube.

Many headers are of a type in which the cutter bar is intended to be in a fixed rigid position relative to the main support tube so that the cutter bar is not intended to flex or float relative to the main structural tube in response to changes in ground contour.

This rigid type of header has the advantage that it allows more accurate control of the position of the fingers or bats of the reel relative to the cutter bar so as to more accurately control the crop as it is swept onto the cutter bar and the table rearwardly of the cutter bar.

In this rigid header type, therefore, the support beams extending forwardly from the main structural tube are substantially rigid and hold the cutter bar in fixed position.

Alternative types of header mount the cutter bar for floating or flexing movement relative to the main structural support tube. This type of header is used to provide an improved action in following the contour of the ground and is advantageous in some circumstances. This type of header however has the disadvantage that the flexing or floating of the cutter bar relative to the main support tube causes movement of the cutter bar relative to the bats or fingers of the reel so that it is no longer possible to maintain a close tolerance between the bats or fingers and the cutter bar.

Various manufacturers provide a flexing cutter bar structure for example the Soybean Header manufactured by Case IH under the serial No 820 or 1020.

Other types of header provide a cutter bar which is relatively rigid but can float upwardly and downwardly relative to the main structural support tube of the header. This type of header again is used to allow close floating action of the cutter bar on the ground surface and one example is shown in the "Dial-a-matic Header Height Control" available for various Deere and Company combine harvesters. This floating action of a cutter bar however occurs relative to the main structural tube and therefore relative to the reel so that the cutter bar to reel cooperation cannot be optimized.

The present invention is not concerned with the floating or flexing type cutter bar described above but is instead directed to an arrangement in which the main structural tube and support beams are intended to hold the cutter bar substantially rigid and fixed relative to the main structural support tube so as to allow an optimization of the cooperation between the reel and the cutter bar.

However, as the width of headers has increased in recent years, the amount of flexing of the structure of the header which occurs has necessarily increased.

In general the header frame structure includes a central pair of inner support beams each spaced outwardly from a midpoint of the main structural tube and at least one outer pair of support beams which are arranged at or adjacent the outer ends of the main structural tube. In some headers additional support beams can be positioned between in the inner and outer support beams to provide additional structural support.

The header frame is generally attached to the support vehicle, either a tractor or a combine harvester, by attachment of the inner pair of support beams to suitable support elements on the vehicle. The outer support beams and the outer parts of the main support tube are therefore cantilevered outwardly from this support structure and thus have a tendency to flex downwardly due to the weight of the elements themselves and the further structure of the header carried on those elements. In particular the reel of the header is generally carried on reel arms which are supported on the main support tube at or adjacent the ends of the main support tube so as to apply a significant weight to the main support tube at the ends thus causing the ends to flex downwardly under that weight.

In addition headers can be used with different types of reel depending upon the requirements of the farmer.

In order to accommodate this downward flexing of the outer ends of the structure, in initial manufacture, the support beams are welded to the main support tube so that, in an unstressed condition, the cutter bar is upwardly concave, that is the centre part is lower than the two ends of the cutter bar.

When the header is fully assembled onto the carrier vehicle, the weight of the frame tends to flex the frame so as to tend to reduce the concave shape. If the calculations are done correctly and the weight of the reel is properly known, it is possible to arrange the header so that when assembled the cutter bar is straight.

However various components of the header can vary so that the accurate weight of the reel and other elements is not properly known. It is not possible, therefore, in all cases to properly calculate the required concave shape and in some cases, therefore, the cutter bar may flex beyond a straight condition into an upwardly convex shape in which the ends are lower than the centre.

While these flexing movements are relatively small, generally less than one inch across the full width of a header, they can interfere with the optimization of the relationship between the reel and the cutter bar. This occurs particularly if the cutter bar is upwardly convex when installed since any upward flexing movement of the centre part of the cutter bar is added to corresponding downward movement of the outer ends of the cutter bar and the reel so that the total relative movement between the reel and the cutter bar is increased. The preferred longitudinal shape of the cutter bar in the installed condition is therefore either straight or slightly upwardly concave.

SUMMARY OF THE INVENTION

It is one object of the present invention, therefore, to provide an improved header which allows the longitudinal shape of the cutter bar to be arranged so as to allow optimization of the cutter bar to reel positions.

According to one aspect of the invention there is provided a header for a crop harvesting machine comprising: a header frame having: a main elongate support member extending across substantially a full width of the header frame and having two ends each arranged adjacent a respective end of the header frame; a plurality of support beams attached to the support member at longitudinally spaced positions therealong, each support beam extending downwardly and forwardly from the support member to a respective forward end; a cutter bar connected to the forward ends of the support beams so as to extend across the full width of the header frame substantially parallel to and forwardly of the main support member; the support beams including two inner support beams arranged adjacent to but spaced to respective sides of a midpoint of the main support member and at least two outer support beams each spaced outwardly from a respective one of the inner support beams toward a respective one of the ends of the main support member such that each of the inner support beams is associated with at least one outer support beam on a respective side of the mid point; the support beams being substantially rigid such that the forward end of each support beam is held at a position which is substantially fixed relative to the main support member and thus the cutter bar is substantially fixed relative to the main support member during operation of the header and so as to avoid any substantial flexing movement of the cutter bar relative to the main support member during said operation; at least some of the support beams each including adjustment means thereon for fine, limited adjustment of the position of the forward end of the respective support beam relative to the main support member; the adjustment means being arranged so as to effect adjustment of relative heights of the forward end of the inner support beam and the forward end of the associated outer support beam so as to effect a change in a longitudinal shape of the cutter bar.

Preferably only one of the inner support beam and the associated outer support beam have said adjustment means thereon.

Preferably only the inner support beams have said adjustment means thereon such that the relative adjustment of the heights of the forward end of the inner support beam and the associated outer support beam are adjusted by the adjustment means on the inner support beam.

Preferably the adjustment means is arranged to effect plastic deformation of the respective support beam.

Preferably the adjustment means includes a manually operable screwjack.

Preferably the adjustment means includes a slot formed in the beam transversely to a length of the beam member and means for deforming the beam member at the slot by increasing and decreasing a width of the slot.

Preferably the slot extends from an outer surface of the beam member toward a position adjacent to but spaced from an inner surface of the beam member.

Preferably each beam member includes a first portion extending substantially downwardly from the main beam member and a second portion at an angle to the first portion extending forwardly from a lower end of the first portion and wherein the adjustment means is located in a second portion.

Preferably the adjustment means includes two manually operable screw jacks each arranged on a respective side of the beam member.

Preferably each beam comprises a channel which is open at an outer surface thereof.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
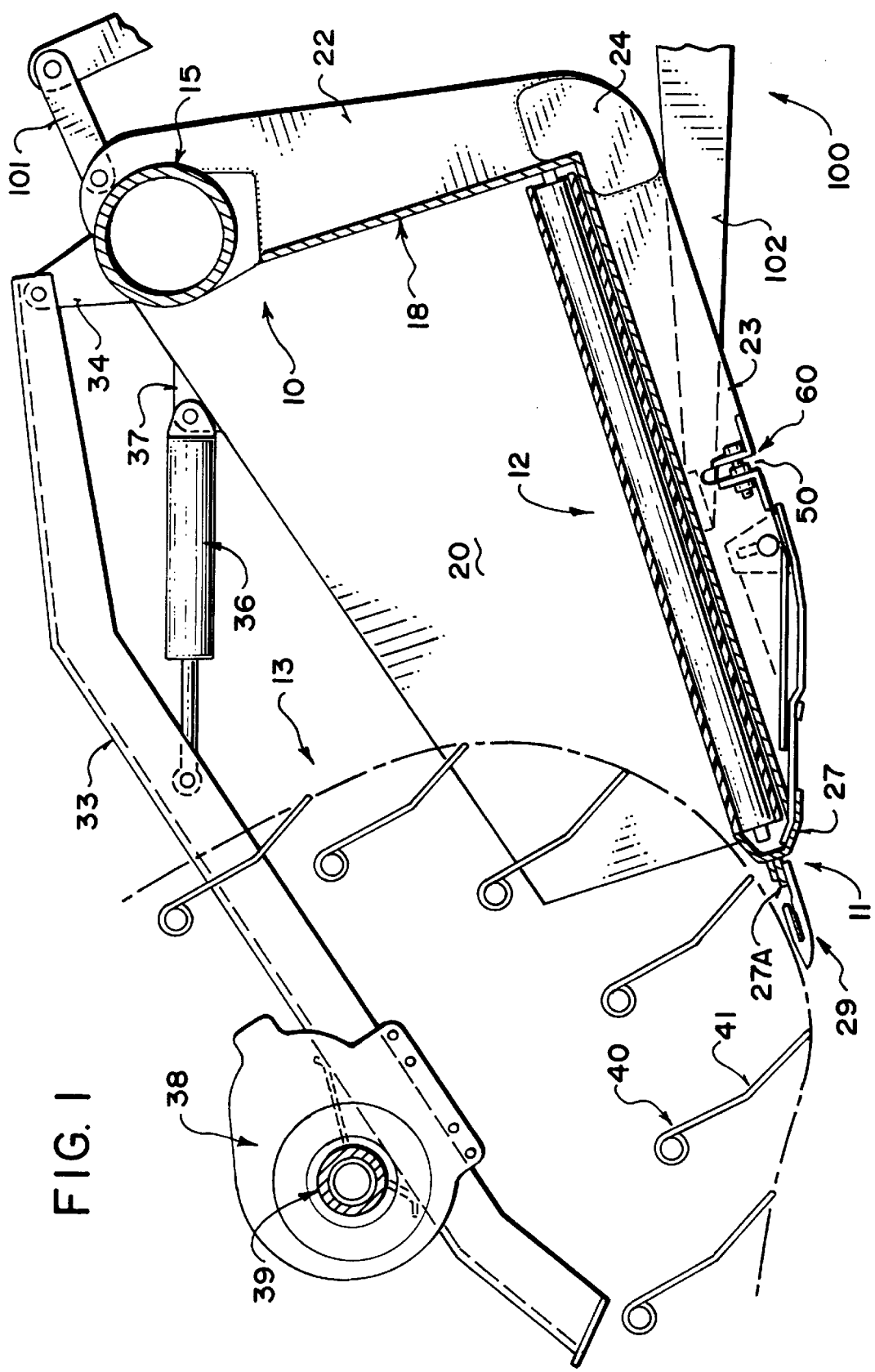
FIG. 1 is a vertical cross sectional view through a header according to the present invention.

The header shown in the Figures comprises a header frame generally indicated at 10, a cutter bar 11 mounted on the header frame, a draper transport system 12 mounted on the header frame and a reel 13 carried on the header frame. The header frame best shown in FIG. 2 comprises a main structural support tube 15 which extends across a rear of the header from ends 16 and 17 arranged at opposite ends of the header so that the tube 15 extends along the full length of the header. The tube thus provides the main structural support for the header. The frame further comprises two inner beams 18 and 19 each of which is attached to the tube so as to be supported thereby. The frame further includes end beams 20 and 21 attached to the ends of the tube 15. The beams 18, 19, 20 and 21 provide support for the cutter bar 11 which extends along the full length of the header parallel to and spaced forwardly of the main tube 15.

Each of the inner support beams 18 and 19 includes a first downwardly depending portion 22 and a second forwardly extending portion 23 connected to a lower end of the first portion 22. Each of the portions 22 and 23 is formed from a channel member defining an inwardly and upwardly facing web and a pair of parallel sides with the sides lying in a plane which is radial to a longitudinal axis of the tube 15. The channel members defining the portions 22 and 23 are connected by welded side plates 24 which attach to the side walls of the channel members.

A suitable support structure for carrying the header on a transport vehicle is indicated at 100 and in the example shown comprises a top link 101 pivotally connected to the tube 15 and a pair of lower arms 102 each of which projects into a respective one of the lower portions 23. The mounting arrangement is not shown in detail as this is well known to one skilled in the rt and a suitable example is available from the header known as HARVEST HEADER (TradeMark) manufactured by the present Assignee MacDon Industries Ltd.

The outer beams 20 and 21 are fabricated to define vertical end plates 26 closing the end face of the area downwardly and forwardly of the tube 15. The draper 12 is shown only schematically only in FIG. 1 and is omitted in FIG. 2 since again this is well known to one skilled in the art. In general the draper transport system includes a pair of drapers each arranged adjacent end of the header and arranged to transport the material longitudinally of the header and a feed draper which is arranged between the two side drapers so as to feed material rearwardly through an opening between the inner beams 18 and 19 and underneath the tube 15.

The cutter bar 11 includes a channel member 27 attached to a forward end 28 of the support beams. The channel member 27 carries a forwardly projecting horizontal support flange 27A on which is mounted a sickle knife assembly 29 again of conventional construction.

The cutter bar 11 is fixed by welding to the beams and is thus fixed relative thereto and is supported thereby at a position parallel to the tube 15 and forwardly and downwardly of the tube 15.

The frame is maintained in square condition by brace structures 30 and 31 which are attached to one side wall of the respective beams 18 and 19 and extend therefrom outwardly and forwardly to the cutter bar 11.

The reel 13 is again of conventional construction and more detail of this construction is shown in prior issued U.S. Pat. No. 4,776,155 and 4,751,809 assigned to the present Assignee.

The reel comprises a pair of reel arms 33 each of which is attached to a respective end of the tube 15 and is pivotally mounted on a respective device 34 at the respective end 16, 17 of the tube 15. The reel arms 33 extend forwardly and downwardly from the device 34 and can be raised and lowered by a hydraulic cylinder 36 mounted on a device 37 on the top wall of the respective end beam 20, 21. The reel arm 33 carries a bearing and drive assembly 38 which allows rotation of a main support beam 39 of the reel with that support beam carrying a plurality of angularly spaced reel bats 40 for rotation around a longitudinal axis of the beam 39.

As shown schematically in FIG. 1 and as described in more detail in the above application, the bats 40 include fingers 41 which are arranged to pass closely adjacent the sickle knife 29. As is well known, the careful and accurate control of the cooperation between the fingers 41 and the sickle knife 29 is important to maintain effectively control over the crop as it is carried from the ground through the cutting action of the knife and onto the draper transport system 12.

Figure 2:
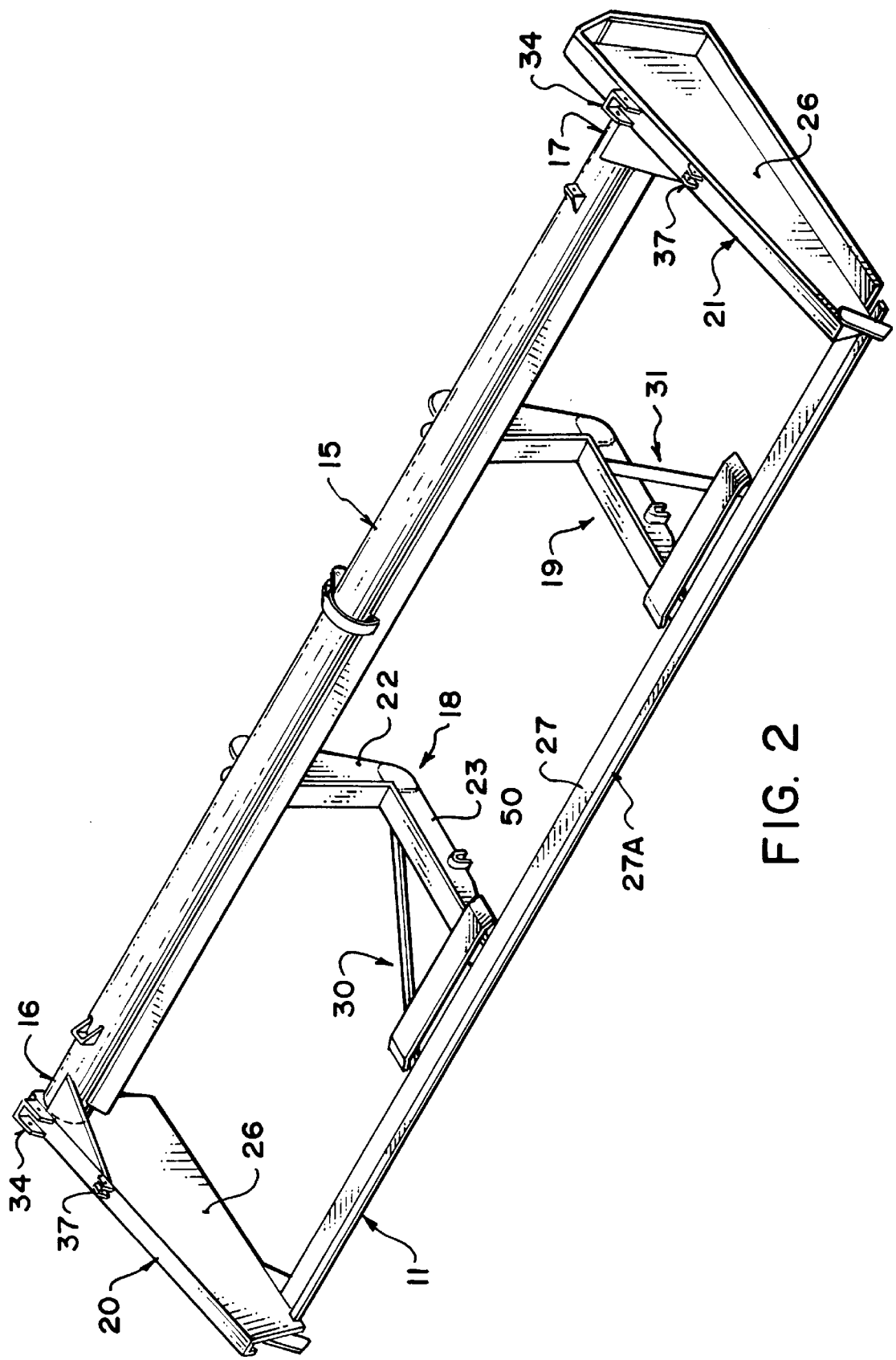
FIG. 2 is an isometric view showing the header frame with the remaining elements removed.

It will be noted from the frame structure of FIG. 2 that the support to the header from the transport vehicle is applied through the portions 22 of the inner beams 18 and 19 to the centre part of the tube 15. The outer part of the tube 15 and the outer beams 20 and 21 are thus cantilevered from the supported section with the tendency therefore to flex or slightly droop under the weight of the frame itself, the elements carried by the frame including the various drive systems and the reel.

Figure 3:
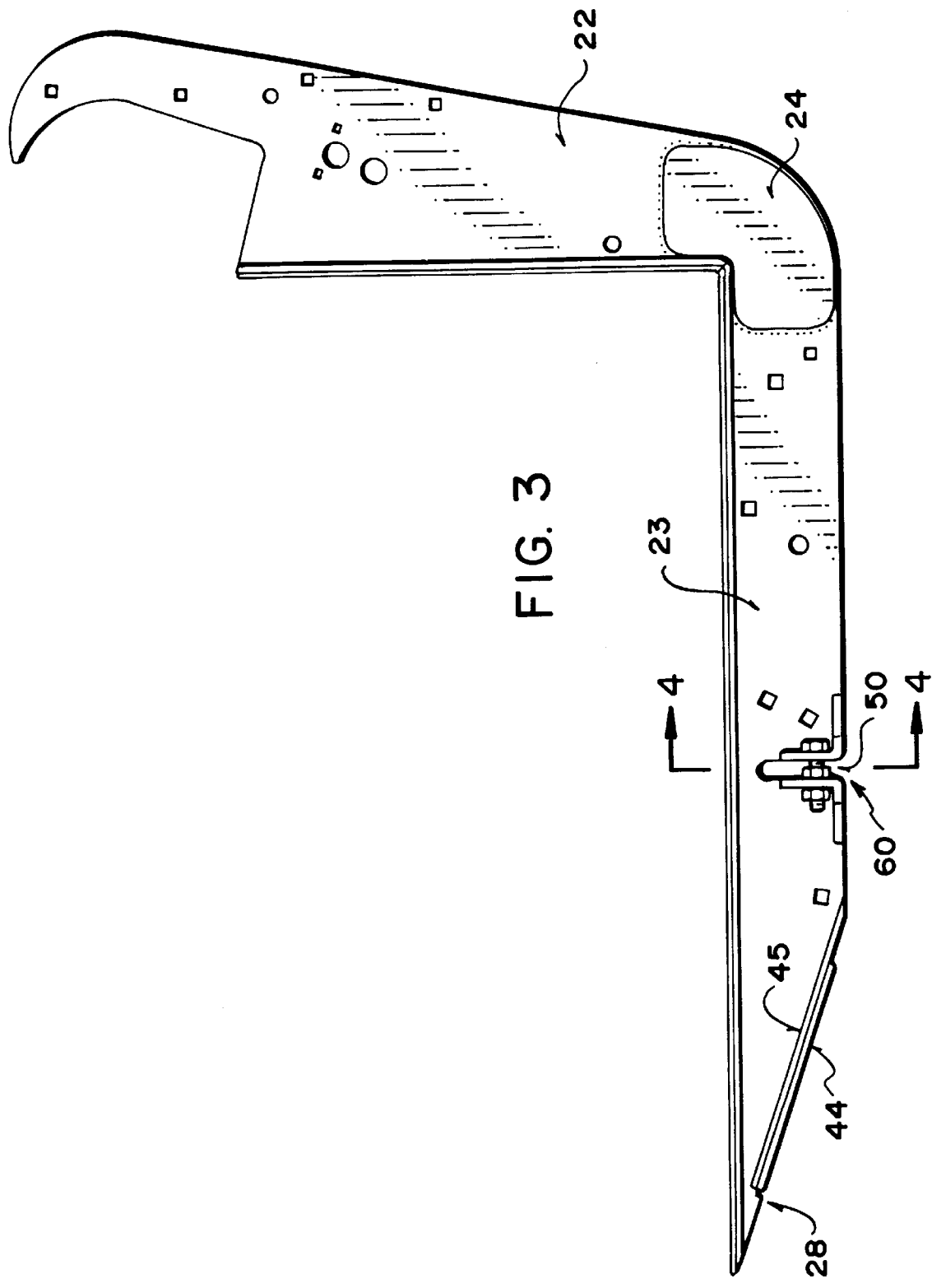
FIG. 3 is a side elevational view of one inner support beam of the header of FIG. 1.
Figure 4:
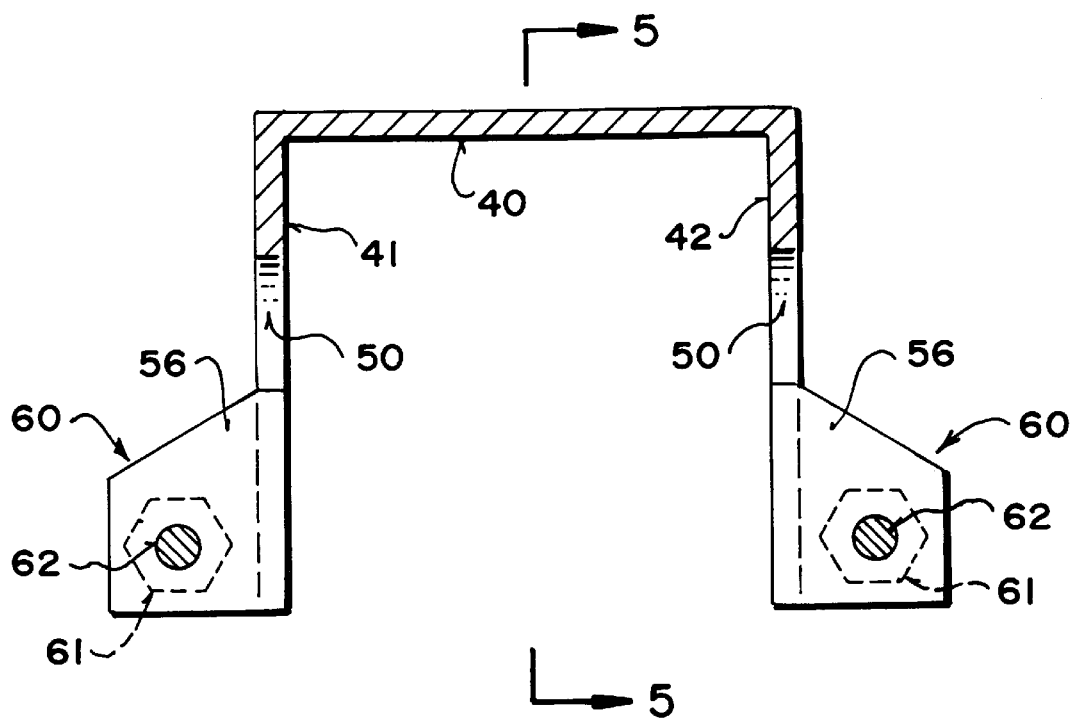
FIG. 4 is a cross sectional view taken along the lines 4—4 of FIG. 3.
Figure 5:
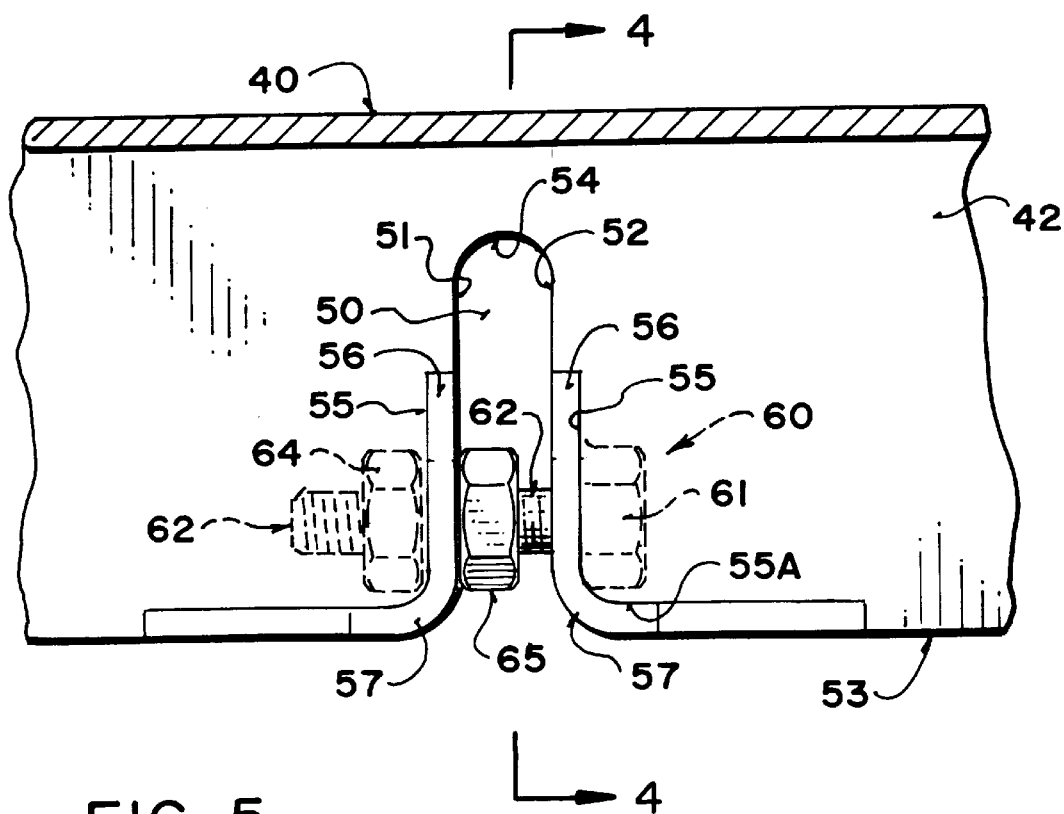
FIG. 5 is a cross sectional view along the lines 5—5 of FIG. 4.

The structure of the inner beams 18 and 19 is shown in more detail in FIGS. 3, 4 and 5. Thus it will be noted from FIG. 4 that the portion 23 of each of the beams is formed from a channel member having an upper transverse web 40 and a pair of depending sides 41 and 42. The forward end 28 of the portion 23 includes an inclined bottom surface 44 with an end plate 45 attached thereto. The side plates 41 and 42 of the channel member forming the portion 23 are cut to form a slot 50 with slot sides 51 and 52 which are at right angles to a bottom edge 53 of the sides 41 and 42. An upper part of the slot is arched as indicated at 54. The arched top 54 is spaced downwardly from the top web 40.

Each of the sides 51 and 52 of the slot is cut out at 55 to receive the thickness of an edge flange 56 welded into the recess defined by the cut out 55. The flange 56 includes a curved bottom section 57 which extends around a bottom part of the cut out 55 as indicated at 55A.

Thus each side edge of each of the slots carries a respective one of four flanges 56 which is attached to the side edge and extends outwardly to the respective side as best shown in FIG. 4. The flanges are thus rigid with the edges of the slots. The flanges are arranged in pairs with each pair on a respective side of the channel member and each pair extending outwardly at right angles to the channel member with the flanges being parallel as shown in FIG. 5. The flanges are interconnected by a bolt structure 60 having a bolt head 61 welded to one of the flanges and a threaded bolt rod 62 extending through a hole in the respective flange, across the space between the flanges, through a hole in the other of the flanges to an end beyond the other of the flanges. Two nuts 64 and 65 are provided which clamp between them the other of the flanges.

In this way the spacing between the flanges can be adjusted by rotating the nuts 64 and 65 such that the nut and bolt structure acts as a screwjack to screw the flanges inwardly or outwardly as required.

The screwjacks thus defined are arranged adjacent the bottom edge 53 of the sides of the channel member so that actuation of the screwjacks causes plastic deformation or bending of the respective channel member.

Adjustment of the screw jacks is carried out carefully so that both screw jacks of the respective channel member are adjusted by the same amount so as to ensure that the channel member is not deformed in a side to side direction but instead the channel member is deformed simply by bending of the upper web 40 and that portion of the sides between the top of the slot and the web.

In manufacture and assembly of the header, the welding of the support beams on the main tube is effected such that the cutter bar is upwardly concave when the frame is in an unstressed condition.

When the header is assembled including the reel and other accessories necessary for operating the header, the additional weight applied by those elements and the frame itself when the frame is supported by the transport vehicle as previously described, the extra weight tends to cause the frame to droop so that the ends of the cutter bar move downwardly to reduce the upwardly concave shape of the cutter bar so that it becomes longitudinally straight or upwardly convex. The screwjacks 60 are then adjusted with the header fully assembled and supported by the transport vehicle so that the cutter bar is longitudinally straight or slightly upwardly concave. In particualar, the reel is firstly moved to a reel down position close to the cutter bar and the reel down position is adjusted at the operating cylinder 36 so that the clearance between the reel and the cutter bar at the ends of the reel are of the order of 0.5 to 1.0 inch. The reel deflects at its center so that the center is slightly lower than the ends. The center part of the cutter bar is then adjusted relative to the ends to provide a slight upwardly concave shape in which the curvature of the cutter bar is slightly greater than that of the reel to an amount to provide a clearance at the center which is in the range 1.0 to 1.5 inch, that is approximately 0.5 inch greater than that at the ends. This configuration allows for flexing of the reel and header in the event that they impact the ground.

This adjustment is effected manually by rotating the nuts 64 and 65 so as to actuate the screwjacks in the direction required to obtain this required condition. This adjustment can be effected by measuring the clearance between the cutter bar and the reel bats at the ends and at the center.

Once the adjustment is complete, the beams are plastically deformed or slightly bent and remain in that condition during further operation of the header.

As previously described the header is of the type which remains substantially rigid during operation so that there is no intended bending or floating of the cutter bar and the cutter bar thus remains substantially straight and substantially directly parallel to the tube 15.

The adjustment coud be located at other positions in the channels 22 and 23, for example at the knee between the two portions. Such a location would provide the maximum movement at the cutter bar for minimum adjustment at the adjustment location. The selection of the adjustment location at a position slightly more than half way along the portion 23 ensures that a minimum loading is applied to the adjustment location from the supprt arms 102.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A header for a crop harvesting machine comprising:

a header frame having:

a main elongate support member extending across substantially a full width of the header frame and having two ends each arranged adjacent a respective end of the header frame;

a plurality of support beams attached to the support member at longitudinally spaced positions therealong, each support beam extending downwardly and forwardly from the support member to a respective forward end;

a cutter bar connected to the forward ends of the support beams so as to extend across the full width of the header frame substantially parallel to and forwardly of the main support member;

the support beams including two inner support beams arranged adjacent to but spaced to respective sides of a midpoint of the main support member and at least two outer support beams each spaced outwardly from a respective one of the inner support beams toward a respective one of the ends of the main support member such that each of the inner support beams is associated with at least one outer support beam to define therewith a set of beams on a respective side of the midpoint;

the support beams being substantially rigid such that the forward end of each support beam is held at a position which is substantially fixed relative to the main support member and thus the cutter bar is substantially fixed relative to the main support member during operation of the header and so as to avoid any substantial flexing movement of the cutter bar relative to the main support member during said operation;

for each set of beams on a respective side of the midpoint, at least one of the inner support beam and the associated outer beam including adjustment means thereon for fine, limited adjustment of the position of the forward end of said one of the inner support beam and the associated outer support beam relative to the main support member;

the adjustment means being arranged so as to effect adjustment of relative heights of the forward end of the inner support beam and the forward end of the associated outer support beam so as to effect a change in a longitudinal shape of the cutter bar.

2. The header according to claim 1 wherein, for each set of beams on a respective side of the midpoint, said adjustment means is provided on only one of the inner support beam and the associated outer support beam.

3. The header according to claim 1 wherein, for each set of beams on a respective side of the midpoint, only the inner support beam has said adjustment means thereon.

4. The header according to claim 1 wherein the adjustment means is arranged to effect plastic deformation of the respective support beam.

5. The header according to claim 4 wherein the adjustment means includes a manually operable screwjack.

6. The header according to claim 1 wherein the adjustment means includes a manually operable screwjack.

7. The header according to claim 4 wherein the adjustment means includes a slot formed in the respective support beam transversely to a length of the respective support beam and means for deforming the respective support beam at the slot by increasing and decreasing a width of the slot.

8. The header according to claim 7 wherein the slot extends from a bottom of the respective support beam toward a position adjacent to but spaced from a top of the respective support beam.

9. The header according to claim 8 wherein each inner support beam includes a first portion extending substantially downwardly from the main main elongate support member and a second portion at an angle to the first portion extending forwardly from a lower end of the first portion and wherein the adjustment means is located in the second portion.

10. The header according to claim 1 wherein each inner support beam includes a first portion extending substantially downwardly from the main main elongate support member and a second portion at an angle to the first portion extending forwardly from a lower end of the first portion and wherein the adjustment means is located in the second portion.

11. The header according to claim 5 wherein the adjustment means includes two manually operable screw jacks each arranged on a respective side of the support beam.

12. The header according to claim 6 wherein the adjustment means includes two manually operable screw jacks each arranged on a respective side of the support beam.

13. The header according to claim 7 wherein each support beam comprises a channel which is open at a bottom thereof.

14. The header according to claim 8 wherein each support beam comprises a channel which is open at the bottom thereof.

* * * * *